United States Patent
Inoue et al.

(10) Patent No.: US 7,627,855 B2
(45) Date of Patent: Dec. 1, 2009

(54) SOFTWARE COMPONENT IMPORTANCE EVALUATION SYSTEM

(75) Inventors: Katsuro Inoue, Osaka (JP); Shinji Kusumoto, Osaka (JP); Makoto Matsushita, Osaka (JP); Hikaru Fujiwara, Osaka (JP)

(73) Assignee: Japan Science and Technology Agency, Saitama (JP)

( * ) Notice: Subject to any disclaimer, the term of this patent is extended or adjusted under 35 U.S.C. 154(b) by 536 days.

(21) Appl. No.: 10/504,868

(22) PCT Filed: Oct. 2, 2002

(86) PCT No.: PCT/JP02/10274

§ 371 (c)(1),
(2), (4) Date: Feb. 9, 2005

(87) PCT Pub. No.: WO03/069466

PCT Pub. Date: Aug. 21, 2003

(65) Prior Publication Data

US 2005/0120333 A1 Jun. 2, 2005

(30) Foreign Application Priority Data

Feb. 18, 2002 (JP) ............................ 2002-040728

(51) Int. Cl.
G06F 9/44 (2006.01)
(52) U.S. Cl. .................................................... 717/120
(58) Field of Classification Search ................... 717/120
See application file for complete search history.

(56) References Cited

U.S. PATENT DOCUMENTS 5,202,996 A * 4/1993 Sugino et al. ............... 717/107

(Continued)

FOREIGN PATENT DOCUMENTS

JP 07-056726 A 3/1995

(Continued)

OTHER PUBLICATIONS

G. Caldiera and V. Basili, "Identifying and qualifying reusable software components", Computer, vol. 24, Issue 2, Feb. 1991 pp. 61-70.*

(Continued)

*Primary Examiner*—Wei Y Zhen
*Assistant Examiner*—Chih-Ching Chow
(74) *Attorney, Agent, or Firm*—Rader, Fishman & Grauer, PLLC

(57) ABSTRACT

A system of measuring software significance for reusing the software based on a certain objective metric is provided. In this system, in inter-file relationship extraction (S212), Java source code files 230 are analyzed, and inter-class inheritance is extracted as reuse relationships. In addition, in SMMT (S222), similarity among Java source code files 230 is calculated. In cluster analysis (S224), cluster analysis is carried out based on the similarity obtained by the SMMT (S222), and a set of files is categorized into M component groups. Relationships among component groups are extracted (S214) from the results of the cluster analysis (S224) and extraction of inter-file relationships (S212). Evaluation is carried out based on the values of relative significance for component groups using the inter-component group relationships (S216). Finally, the values of relative significance for component groups are converted to file (software component) evaluated values (S218).

23 Claims, 5 Drawing Sheets

U.S. PATENT DOCUMENTS

| | | | |
|---|---|---|---|
| 5,230,050 A * | 7/1993 | Iitsuka et al. | 717/145 |
| 5,404,510 A * | 4/1995 | Smith et al. | 707/2 |
| 5,440,742 A * | 8/1995 | Schwanke | 717/120 |
| 5,845,119 A * | 12/1998 | Kozuka et al. | 717/107 |
| 7,069,545 B2 * | 6/2006 | Wang et al. | 717/131 |
| 2003/0135850 A1 * | 7/2003 | Miloushev et al. | 717/165 |
| 2009/0089753 A1 * | 4/2009 | Yoshimura et al. | 717/121 |

FOREIGN PATENT DOCUMENTS

| | | |
|---|---|---|
| JP | 07-141166 A | 6/1995 |
| JP | 08-095764 A | 4/1996 |
| JP | 09-212353 A | 8/1997 |
| JP | 2001-014154 A | 1/2001 |
| JP | 2001-312419 A | 11/2001 |
| JP | 2002-015135 A | 1/2002 |

OTHER PUBLICATIONS

English Translation of the International Preliminary Examination Report.

Etzkom et al., "Automated reusability quality analysis of OO legacy software," Information and Software Technology, vol. 43, pp. 295-308, Elsevier Science B.V. (2001).

Braun, Christine L., "Reuse," Reuse, pp. 1055-1069.

Yamamoto et al., "Component Metrics based on the Component Reusability and its Evaluation," FOSE2001, pp. 105-116, (2001).

International Search Report for PCT/JP02/10274, mailed on Jan. 21, 2003.

* cited by examiner (a)

CORRECTION (b)

FIG.6

RESULTS OF APPLICATION TO JDK-1.3.0

| RANK | CLASS NAME | EVALUATED VALUE |
|---|---|---|
| 1 | java.lang.Object | 0.16126 |
| 2 | java.lang.Class | 0.08712 |
| 3 | java.lang.Throwable | 0.05510 |
| 4 | java.lang.Exception | 0.03103 |
| 5 | java.io.IOException | 0.01343 |
| 6 | java.lang.StringBuffer | 0.01214 |
| 7 | java.lang.SecurityManager | 0.01169 |
| 8 | java.io.InputStream | 0.01027 |
| 9 | java.lang.reflect.Field | 0.00948 |
| 10 | java.lang.reflect.Constructor | 0.00936 |
| ⋮ | ⋮ | ⋮ |
| 1256 | com.sun.image.codec.jpeg.TruncatedFileException | 0.00011 |
| 1256 | sunw.util.EventObject | 0.00011 |
| ⋮ | ⋮ | ⋮ |
| 1256 | sunw.io.Serializable | 0.00011 |
| 1256 | sunw.util.EventListener | 0.00011 |

US 7,627,855 B2

SOFTWARE COMPONENT IMPORTANCE EVALUATION SYSTEM

TECHNICAL FIELD

The present invention relates to significance evaluation of computer software reuse.

BACKGROUND ART

It is important to effectively develop high-quality software within a certain period of time as size and complexity of software increases. In order to achieve this, various software engineering technologies have been proposed. Reuse is the most effective one of them.

Reuse is defined as reuse of existing software components within the same system or another system (e.g., see C. Braun: Reuse, in John J. Marciniak, editor, Encyclopedia of Software Engineering, Vol. 2, John Wiley & Sons, pp. 1055-1069 (1994)). Generally speaking, reuse of software improves productivity and quality, resulting in reduction in costs.

Various methods of evaluating reusability of each software component have been proposed. For example, Etzkorn et al. have proposed a method of quantifying reusability of legacy software components (C++ classes) by calculating various metric values for those components, normalizing them, and adding together the resulting normalized values (see L. H. Etzkorn, W. E. Huges Jr., C. G. Davis: 'AUTOMATED REUSABILITY QUALITY ANALYSIS OF 00 LEGACY SOFTWARE', Information and Software Technology, Vol. 43, Issue 5, pp. 295-308 (2001)). On the other hand, Yamamoto et al. have proposed a method of evaluating the reusability of software components, which are programmed with nondisclosed source codes, only using the interface information of those software components (see Yamamoto, Washizaki, Fukazawa: 'PROPOSAL AND VERIFICATION OF COMPONENT METRICS BASED ON REUSABILITY CHARACTERISTICS', Foundation of Software Engineering (FOSE2001), (2001)). All of these methods evaluate the reusability of components by calculating the static characteristics thereof. In addition, the validity of the proposed, evaluated values of the reusability is evaluated based on the similarity between the ranking of each evaluated value of multiple component reusability and the corresponding result from an actual programmer subjectively evaluating the reusability.

However, high reusability needs quantitative proof of the components actually being reused within many kinds of software. In other words, subjective determination of high reusability is meaningless unless there are actually reused results. It is thought that, in actuality, there are various components reused within various systems even though the reusability thereof may be evaluated to be low by prior arts.

DISCLOSURE OF INVENTION

The objective of the present invention is to provide a system of measuring software reusability based on a certain objective metric.

To achieve the above objective, the present invention provides a significance evaluation system used to reuse software components, which evaluates significance of software components, including: inter-software component relationship extraction means; similarity analysis means for finding similarity among software components and gathering together similar software components into a component group; inter-component group relationship extraction means for finding relationships among component groups from the relationships among software components found by the relationship extraction means and the component groups given by the similarity analysis means; relative significance evaluation means for evaluating relative significance of each component group from the relationships among component groups given by the inter-component group relationship extraction means; and means for transferring a component group evaluated value to a software component belonging to the component group.

The relative significance evaluation means can obtain a relative evaluation value by evaluating so that a frequently used component group or a component group used by a frequently used component group can have a highly evaluated value. In this case, the relative significance evaluation means determines an evaluated value by distributing the evaluated value of a certain component group to all component groups at a distribution ratio d so that a using component group can have a highly evaluated value.

The relative significance evaluation means may distribute to all component groups uniformly the evaluated value of a component group that does not use any component group.

The relative significance evaluation means can obtain an evaluated value by calculating an eigen vector with an eigen value $\lambda=1$ for a square matrix D made up of the distribution ratio d as an element.

Another aspect of the present invention is a recording medium, which stores a computer program that instructs a computer system to construct the above-mentioned software component significance evaluation system.

BRIEF DESCRIPTION OF DRAWINGS

FIG. 6 is a diagram showing software component evaluated results by the relative significance evaluation system.

BEST MODE FOR CARRYING OUT THE INVENTION

An embodiment of the present invention is described forthwith while referencing the drawings.

The present invention evaluates the significance of software component reuse based on actually used results. The basic concepts of significance evaluation according to the present invention are as follows:

(1) There are mutual use relationships among software components.
(2) Typically, use relationships among components change over time when the components have been reused in various development projects.
(3) Components that have been frequently used in long periods of time are significant (have high reusability). In addition, components that are used by significant components are also significant (have high reusability).

The well-known search engine GOOGLE, which although is in a different field, evaluates the significance of all pages on a reasonable premise that pages with a recursive relationship or pages linked from various other pages can be quality pages.

(Software Components)

Figure 1:
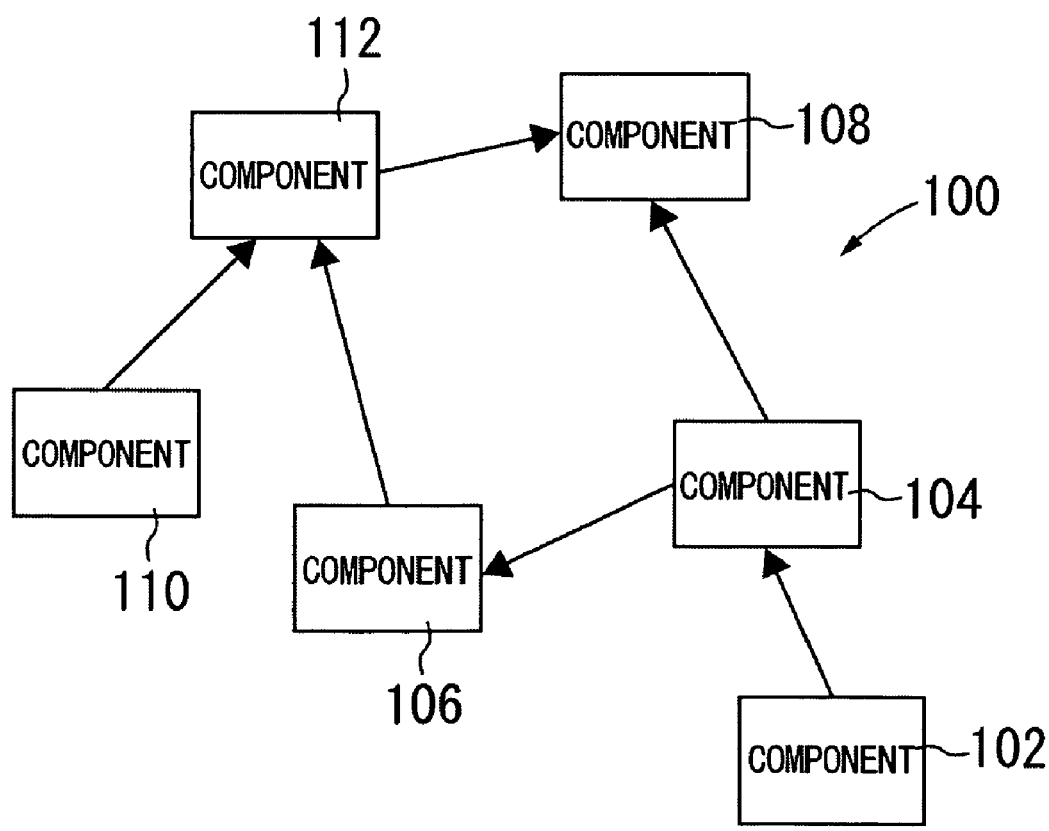
FIG. 1 is a graph showing use relationships among software components.

To begin with, 'software components' to be evaluated in significance and use relationships among them are described using FIG. 1.

Typically, a software component means a component which is designed to allow reuse. Particularly, it may mean a component which allows reuse as a black box, which users need not know the content thereof. In this case, a unit to be reused by developers is called a software component or simply a component regardless of type such as a source code file, a binary file, or a document. As shown in FIG. 1, there are relationships of using and being used among those components. FIG. 1 is a graph 100 showing the use relationships among components. FIG. 1 shows that: a component 102 uses a component 104; and the component 104 uses components 106 and 108. In addition, the component 106 and a component 110 use a component 112; and the component 112 uses the component 108.

(Similar Component Groups)

Typically, a component set includes many duplicated components or duplicated and partially modified components. Accordingly, similar components are gathered together, categorizing a component set into some component groups. Hereafter, a component group of similar components is simply called a component group.

Figure 2:
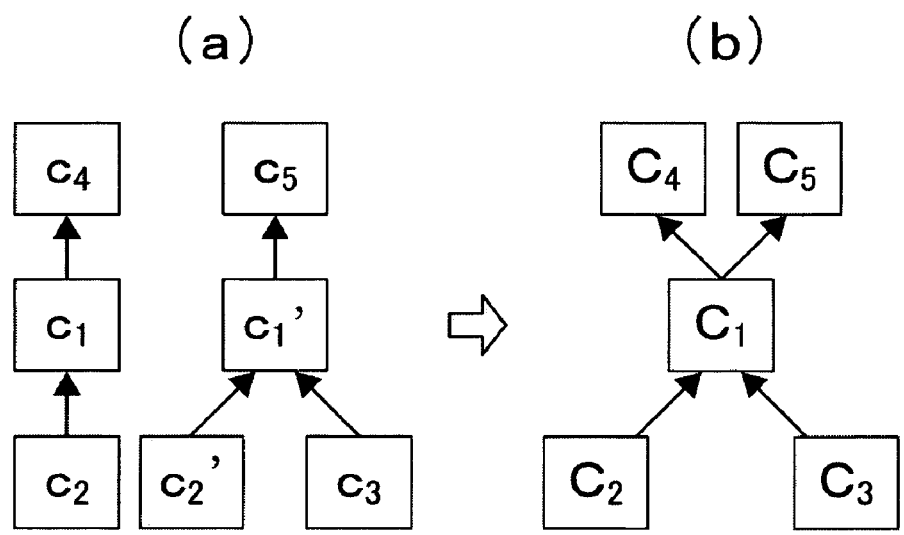
FIG. 2 is a diagram describing gathering together similar software components into a component group.

FIG. 2 is used to describe the above as an example. FIG. 2(a) shows use relationships among components. Components $c_1$ and $c'_1$, and components $c_2$ and $c'_2$ are similar components, respectively. There is no similarity among components $c_3$, $c_4$, and $c_5$. As shown in FIG. 2(a), the component $c_2$ uses the component $c_1$; and the components $c'_2$ and $c_3$ use the component $c'_1$. In addition, the component $c_1$ uses the component $c_4$; and the component $c'_1$ uses the component $c_5$.

FIG. 2(b) shows component groups each including similar components. Components belonging to corresponding component groups are shown as $C_1=\{c_1, c'_1\}$, $C_2=\{c_2, c'_2\}$, $C_3=\{c_3\}$, $C_4=\{c_4\}$, and $C_5=\{c_5\}$.

When a component belonging to a certain component group $C_i$ uses a component belonging to another component group $C_j$, it is assumed that there is a use relationship between those two component groups.

For example, FIG. 2 shows the relationship of using the components $c_1$ and $c'_1$ as a relationship of using the component group $C_1$. In addition, the relationship of being used by the components $c_1$ and $c'_1$ is shown as a relationship of being used by the component group $C_1$.

To employ the above-described concept, quantitative evaluation of the similarity between two components must be carried out using a metric for evaluating the similarity. To begin with, cluster analysis is carried out based on the similarity to categorize a set of n components into m ($0 \leq m \leq n$) component groups. The similarity is normalized within a range between 0 and 1. It is assumed that the higher the value, the higher the similarity among components, and that similarity 1 represents the case of the components being completely the same (duplicated components).

The similarity among component groups is determined based on similarity among components. A reference threshold t ($0 \leq t \leq 1$) of similarity is given to categorize components such that the similarity among component groups can become lower than t, and the similarity among components within a component group can become t or greater.

(Relative Significance)

Various methods of evaluating reusability of each component have been proposed. Etzkorn et al. have proposed a method of evaluating reusability of object-oriented software from four viewpoints: modularity, interface size, documentation, and complexity (see L. H. Etzkorn, W. E. Huges Jr., C. G. Davis: 'AUTOMATED REUSABILITY QUALITY ANALYSIS OF OO LEGACY SOFTWARE', Information and Software Technology, Vol. 43, Issue 5, pp. 295-308 (2001)). This method uses multiple metrics of reusability obtained by normalizing multiple metric values measured from source codes and then adding together the resulting values, and compares those metrics with the reusability obtained by programmers actually evaluating C++ source codes.

Alternatively, Yamamoto et al. have proposed a method of evaluating reusability of components programmed with non-disclosed source codes based on information of the interface thereof. They have defined the metric of reusability from four viewpoints: understandability, usability, testability, and portability, and have compared that metric with the result of programmers actually implementing an application on a JavaBeans basis (see Yamamoto, Washizaki, Fukazawa: 'PROPOSAL AND VERIFICATION OF COMPONENT METRICS BASED ON REUSABILITY CHARACTERISTICS', Foundation of Software Engineering (FOSE2001), (2001)).

All of those methods evaluate the reusability of components by calculating the static characteristics thereof such as structures or interfaces.

In contrast, the present invention evaluates the reusability of components based on the actual results of using them. The significance of reusability is called 'relative significance' as distinguished from the reusability determined based on the static characteristics of among numerous components.

A case of a software developer developing new software reusing existing software components is assumed. Typically, a developer reuses existing software components, which are determined as having high reusability for software to be developed by the developer. Here, reuse of a component by a developer is assumed to give a 'high reusability' supporting vote to that component. When software development by reusing components is repeated many times, components with high reusability are frequently reused, resulting in increase in the number of supporting votes. On the other hand, components with low reusability are less frequently reused, resulting in low supporting votes. In this case, it is thought that software components have respective reusability evaluated values corresponding to the acquired number of votes. Therefore, the following Equation holds true.

(Component evaluated value)=Number of votes to component)

In this case, not only simply counting the acquired number of votes to a component, but weighting the votes based on what type of component has reused that component. A valuable component which is used by many other components (or a component which is reused by a developer of a valuable component) is regarded as a high significance component for reusing, and a greater weight is assigned to a case of being voted from a high significance component than a case of being voted from a low significance component.

In addition, the number of components reused by a certain component is also considered. Reuse of many components by a certain component A decreases the proportion of the function of each reused component to A's function, resulting in dispersion of lowered significance. Therefore, when a certain component gives votes to multiple components, weights of votes should be distributed to the respective reused components in a certain distribution ratio, and the following Equation holds true.

(Weight of vote)=(Vote source evaluated value)×(vote destination distribution ratio)

In this way, evaluation which is determined by components in a component set evaluating and giving votes on each other's significance is called 'relative significance', and the total sum of the weights of votes obtained by respective components is called 'value of relative significance'.

In the case of developing Software by repetitively reusing components, since newly developed software will have accumulated, the number of components in a component set will increase, and reuse relationships will change. Since the value of relative significance is calculated from reuse relationships in a component set, when the number of components in a component set or the reuse relationship changes, the evaluated values before and after the change cannot be compared. To solve this problem, attention is directed to the ranks of components based on the evaluated values rather than the evaluated values themselves. This facilitates understanding of how the relative significance of a component has changed, by observing change in the rank of the component before and after the number of the components in a component set or reuse relationship has changed.

As described above while referencing FIG. 2, each actual component set includes many duplicated or similar components. Therefore, according to a proposed method, each component group is defined as a unit of components, and evaluation is carried out by ranking component groups based on the values of relative significance for those respective component groups. This method is called 'relative significance ranking (RSR) method'.

Figure 3:
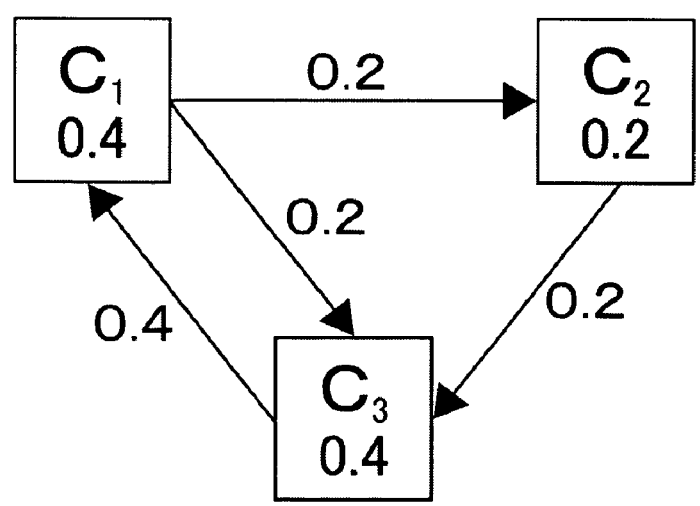
FIG. 3 is a diagram describing evaluation of software component groups.

The above-mentioned distribution of the evaluated values is described while referencing FIG. 3. In FIG. 3, $C_1$, $C_2$, and $C_3$ denote respective component groups. Use relationships are shown by arrows each pointing from a using component group to a to-be-used component group. For simplification, the distribution ratio for unused component groups is 0. In addition, the distribution ratio for each using component is the same. $v_1$, $v_2$, and $v_3$ denote the evaluated values of component groups $C_1$, $C_2$, and $C_3$, respectively, and the total sum thereof is 1. In this case, as shown in the use relationships of FIG. 3, the evaluated values of the component groups are: $v_1=0.4$, $v_2=0.2$, and $v_3=0.4$, respectively. Accordingly, the component groups $C_1$ and $C_3$ are evaluated as having higher relative significance than the component group $C_2$.

(Categorization of Components)

It is assumed that there are n components to be evaluated and that $c_1, c_2, \ldots, c_n$ denote them, respectively. There are directional relationships among components. For example, the relationship from a component $c_i$ to a component $c_j$ is represented by $r(c_i, c_j)$, where $r(c_i, c_j)$=if ($c_i$ uses $c_j$), then true;

else false.

The similarity between components is represented by $s(c_i, c_j)$. Here, the similarity is normalized within the range of $0 \leq s(c_i, c_j) \leq 1$.

A set of all components to be evaluated is represented by $C=\{c_1, c_2, \ldots, c_n\}$. The similarity between component sets is determined based on similarity s between components. For example, the similarity between component sets $C_i$ and $C_j$ is represented by $S(C_i, C_j)$. Here, the similarity is normalized within the range of $0 \leq S(C_i, C_j) \leq 1$.

Definition 1: Assuming that the threshold of the similarity, which is a reference for categorization, is t ($0 \leq t \leq 1$), subsets $C_1, C_2, \ldots, C_m$ of component set C divided so as to satisfy the following conditions are called similar component groups.

Similarity s between each of all components belonging to $C_i$ is t or greater.

$$\forall c_k, c_l \in C_i | s(c_k, c_l) \geq t \quad (1.1)$$

Similarity S between different sets is lower than t. In other words, the following Expression holds true for all of i, j ($1 \leq i, j \leq m$).

$$S(C_i, C_j) < t (i \neq j) \quad (1.2)$$

The component set C is divided into m similar component groups $C_1, C_2, \ldots, C_m$. Hereafter, a similar component group is simply called a component group.

Definition 2: Assuming that $c_i \in C_i$, $c_j \in C_j$, and if there is a use relationship from a certain $c_i$ to a certain $c_j$, it is assumed that there is a use relationship from $C_i$ to $C_j$. In other words, $R(C_i, C_j)$=if ($\exists c_i, c_j$)|$r(c_i, c_j)$, then true;

else false.

(Definition of Relative Significance Evaluation)

Each component group has a value of relative significance, and $v_i$ denotes the value of relative significance of the component group $C_i$. In addition, $w_{ij}$ denotes the weight of the use relationship from $C_i$ to $C_j$.

Definition 3: A value of relative significance of the component group $C_i$ is the total sum of weights $w_{ji}$ of the use relationships to the component group $C_i$.

$$v_i = \sum_{j=1}^{m} w_{ji} \quad (3)$$

A weight distribution ratio from the component group $C_i$ to the component group $C_j$ is denoted as $d_{ij}$.

Definition 4: Weight $w_{ij}$ of the use relationship from the component group $C_i$ to the component group $C_j$ is a value where the value of relative significance of $C_i$ is distributed in the distribution ratio $d_{ij}$.

$$w_{ij} = v_i d_{ij} \quad (4)$$

Definition 5: A value of relative significance of the component group $C_i$ is distributed to all component groups $C_j$ ($1 \leq j \leq m$).

$$\sum_{j=1}^{m} d_{ij} = 1 \quad (5)$$

Definition 6: Distribution ratio to using component groups is higher than that to non-using component groups. In other words, if $R(C_i, C_j)$=true, and $R(C_i, C_k)$=false, then $$d_{ij} > d_{ik} \quad (6)$$

(Corrections)

Since application of the above-defined values of relative significance to actual software components causes some problems, a few corrections must be made. Those problems and corresponding countermeasures are described forthwith.

(Evaluation of Components that do not Use Other Components)

Typically, there is a component which has been developed using no other components in software development.

When a certain component group $C_i$ does not use any other component, no component group receives a vote from $C_i$. In other words, no evaluated value can be distributed to all component groups, and assuming that $d_{i0}, d_{i1}, d_{i2}, \ldots, d_{im}$ are all 0, Definition 5 is not satisfied. Consequently, when no component receives a vote, this is interpreted as a vote with an evaluation of 'very low significance' having been given to all component groups.

Correction 1: If a component group $C_i$ does not reuse any component group, for all j, $$d_{ij} = \frac{1}{m} \quad (7)$$

(Case of Evaluation Results not Circulated Throughout the Entirety)

Figure 4:
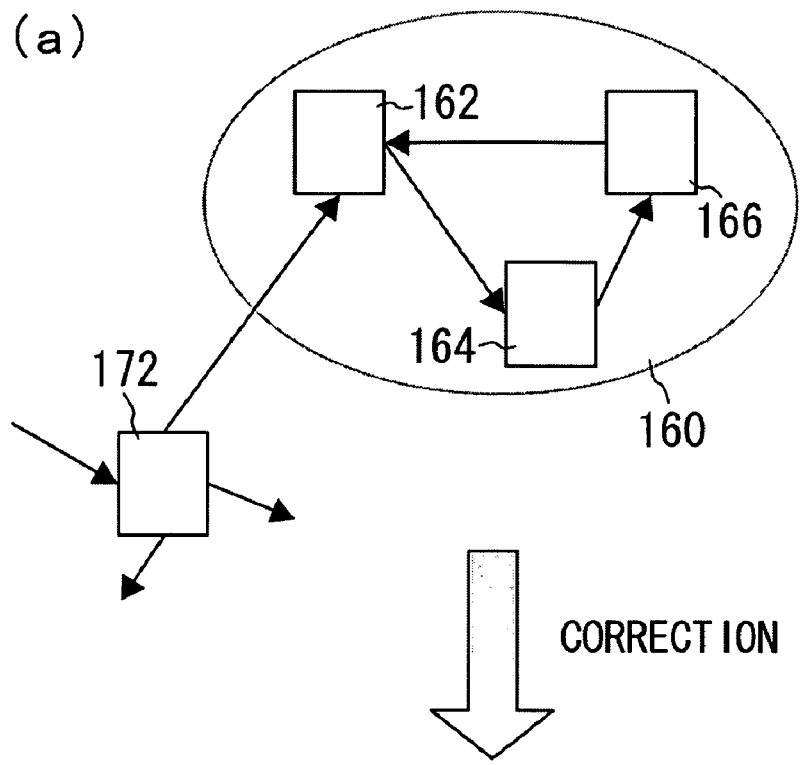
FIG. 4 is a diagram describing correction when evaluating software component groups.
Figure 4:
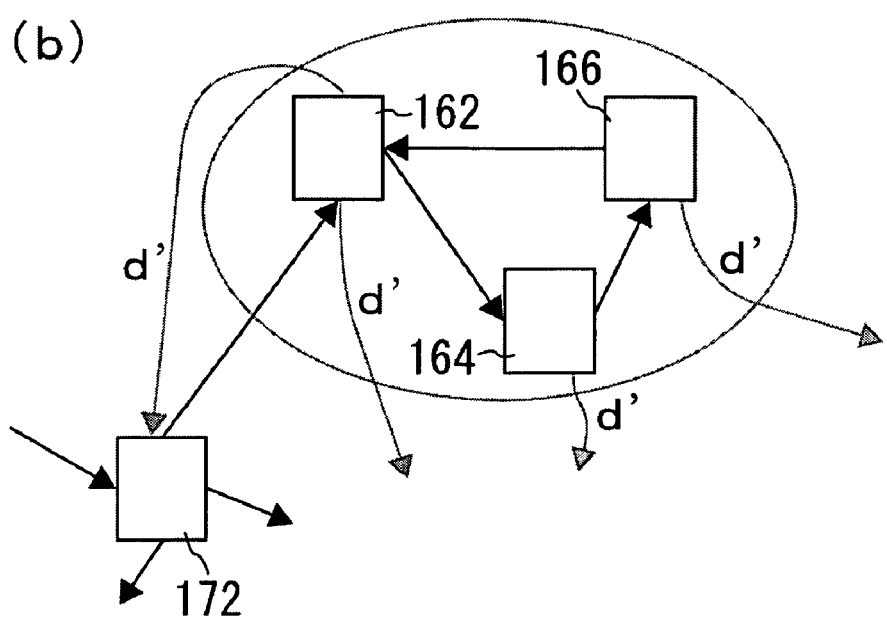

This case is described while referencing FIG. 4. In FIG. 4, squares indicate component groups 162, 164, 166, and 172, and arrows indicate use relationships. In FIG. 4(a), there is an arrow penetrating component groups within an ellipse 160, but no arrow extending out therefrom. As a result, votes of significance evaluation are accumulated in that ellipse. In other words, votes do not circulate through the entirety. Therefore, it is thought in the case of not using component groups, a vote with a very low weight is given as shown by pale arrows d' in FIG. 4(b).

Correction 2: Evaluated values p (0<p<1) of component groups are distributed to only used component groups, and the remaining values (1−p) are distributed to all component groups. Assuming that $d_{ij}$ denotes the original distribution ratio, and $d'_{ij}$ denotes the corrected distribution ratio, the distribution ratio is corrected as follows:

$$d'_{ij} = pd_{ij} + (1-p)\frac{1}{m} \quad (8)$$

(Evaluated Value Calculation Method)

This section describes calculation of a value of relative significance resulting in calculation of an eigen vector of a distribution ratio matrix.

The following Equation (9) holds true according to Definitions 3 and 4.

$$v_i = \sum_{j=1}^{m} v_j d_{ji} \quad (9)$$

Evaluated values of all component groups can be determined by solving this Equation (9) for all $v_i$ (i=1, 2, ..., m).

In other words, the following m simultaneous equations should be solved.

$$v_1 = \sum_{j=1}^{m} v_j d_{j1} \quad (10)$$

$$v_2 = \sum_{j=1}^{m} v_j d_{j2}$$

$$\vdots$$

$$v_m = \sum_{j=1}^{m} v_j d_{jm}$$

The above is represented in a matrix syntax.

Assume that V denotes an m-dimensional column vector which represents evaluated values of m component groups.

$V=(v_1, v_2, \ldots, V_n)^t$, where superscript t denotes transposition.

In addition, D denotes an m×m matrix which represents distribution ratio from $C_i$ to $C_j$.

$$D = \begin{pmatrix} d_{11} & d_{12} & \cdots & d_{1n} \\ d_{21} & d_{22} & \cdots & d_{2n} \\ \vdots & \vdots & \ddots & \vdots \\ d_{n1} & d_{n2} & \cdots & d_{nn} \end{pmatrix}$$

With this, simultaneous equations (10) are represented by $$V=D^tV \quad (11)$$

A vector V which satisfies Equation (11) is an eigen vector for an eigen value λ=1 for matrix $D^t$.

As a result, calculation of the eigen vector for the distribution ratio matrix allows provision of a value of relative significance.

(Significance Evaluation System)

A system according to the present invention is described as a relative significance evaluation system for JAVA source codes based on the above-mentioned significance evaluation model. Table 1 shows the correspondence between the model and JAVA(T) concept when applying the above-mentioned method (RSR method) to JAVA(T).

TABLE 1

| Model of RSR method | JAVA (T) |
|---|---|
| Component | JAVA source file |
| Similarity | See Patent Application No. 2002-015135, or the like |
| Use relationship | Inheritance, implementation, calling |

JAVA(T) is an object-oriented language, which allows easy reuse by class. In addition, only one class is described for a single source code file as a rule. Moreover, the RSR method is applied, assuming a JAVA source code file to be a unit of component. Inheritance of classes, implementation of abstract classes and interfaces, and calling of methods are regarded as use relationships. In addition, the similarity proposed in Patent Application No. 2002-015135 and 'INVESTIGATION OF SIMILARITY AMONG SOFTWARE SYSTEMS USING A CLONE DETECTION TOOL' (Institute of Electronics, Information, and Communication Engineers Research Report vol. 101 No. 240, Jul. 30, 2001) is used as a metric for evaluating the similarity among components. This is a method of measuring similarity from the ratio of the number of identical lines between two source code files. A system 'similarity metrics measuring tool'(SMMT), which measures similarity from source code files, has been developed (see Patent Application No. 2002-015135). The SMMT is used in this system to calculate the similarity.

(System Configuration)

Figure 5:
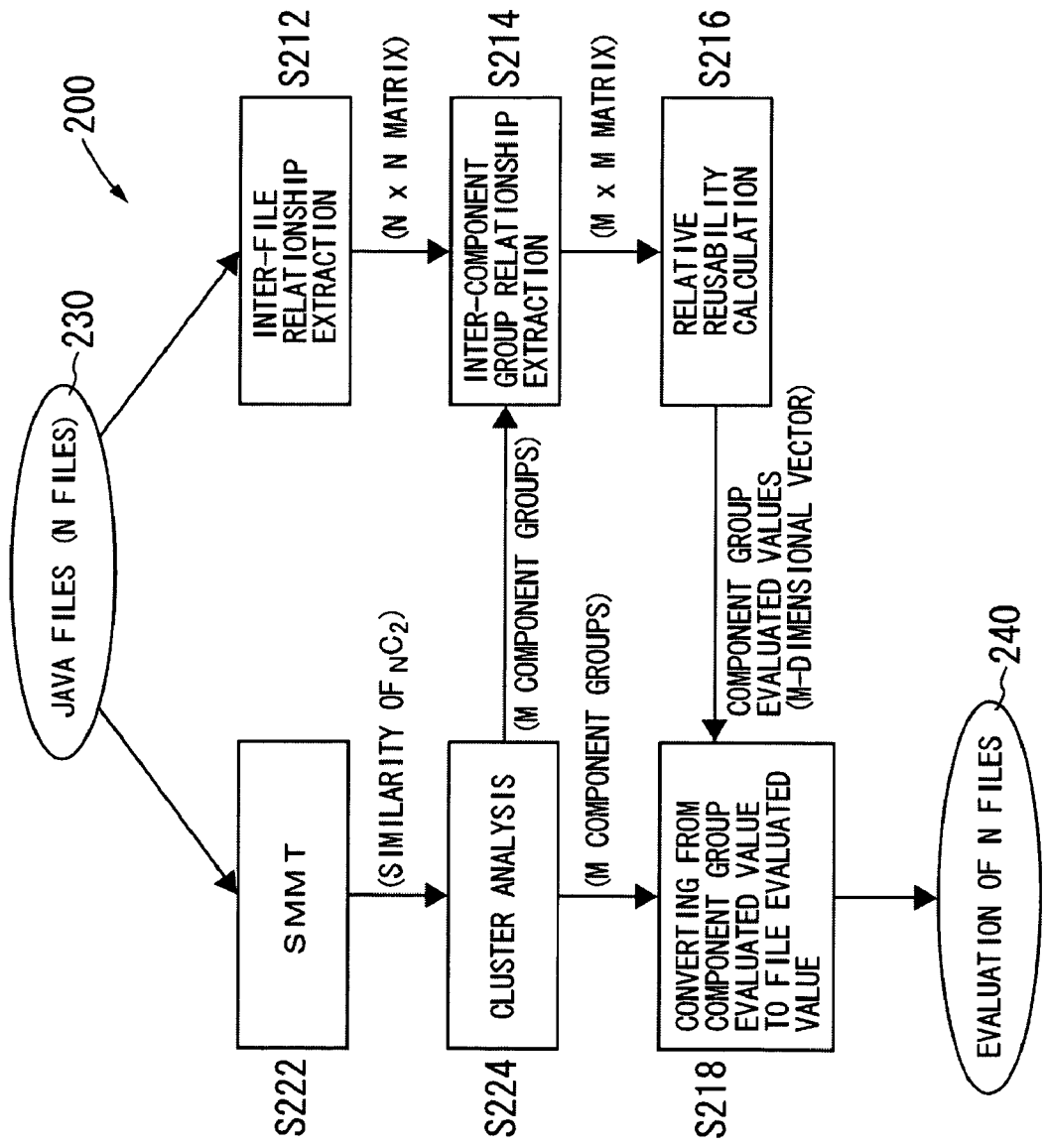
FIG. 5 is a diagram describing a configuration of a relative significance evaluation system according to an embodiment of the present invention.

FIG. 5 shows a configuration of the relative significance evaluation system. The system evaluates the relative significance of N JAVA source code files 230. Each processing in this system is described forthwith.

Inter-file relationship extraction (S212): Analyzes JAVA source code files 230, and extracts inter-class inheritance, implementation of abstract classes and interfaces, and calling of methods as reuse relationships.

SMMT (S222): Calculates similarity among JAVA source code files 230.

Cluster analysis (S224): Carries out cluster analysis based on the similarity obtained by the SMMT (S222), and categorizes a set of files into M component groups. In the cluster analysis, threshold t, which is a reference for categorization, is given as a parameter (see the above Definition 1).

Inter-component group relationship extraction (S214): Extracts relationships among component groups from the results of the cluster analysis (S224) and extraction of inter-file relationships (S212).

Relative significance calculation (S216): Evaluates based on the values of relative significance for component groups obtained through the RSR method using the inter-component group relationships. Note that a JAVA matrix package (JAMA), which is written in JAVA(T) and carries out matrix calculation, is used to calculate an eigen value of a matrix.

Conversion from component group evaluated values to file (software component) evaluated values (S218): Converts the values of relative significance for component groups to file (software component) evaluated values.

An example of actually applying the above-mentioned relative significance evaluation system to JAVA source code is given below. In this case, JDK-1.3.0 is selected as an evaluation target. As adjustment parameters, the threshold for categorization in cluster analysis described in Definition 1 is s=0.80, and the proportion of the weights of votes described in Correction 2 is p=0.85. FIG. 6 shows a part of the results of applying to the JDK. A table in FIG. 6 lists the results of sorting the file evaluated values for the respective JDK classes.

The JDK is a JAVA(T) standard package, which is needed to develop application in JAVA(T). In FIG. 6, the top 10 classes in relative significance are occupied by classes to be used according to JAVA(T) language specifications, such as Object, Class, and Throwable. According to the JAVA(T) language specifications, the java.lang.Object class is a super class for all classes. In other words, that class is reused by all classes. Therefore, the relative significance comes out on top. On the other hand, the java.lang.Class class is a class representing classes in execution and interfaces. There is no class which directly inherits that class, but it is frequently called to obtain an executable object type of information. The java.lang.Throwable class is a super class for all errors and exceptions. Therefore, all classes which handle exceptions and errors indirectly reuse that class. As described above, classes which are directly or indirectly used frequently hold high ranking.

The lowest ranking is the 1256th, and there are 622 classes placed therein. Those classes are not reused by any class.

As described above, the relative significance evaluation system calculates the evaluated values which reflect significance of actual reuse.

INDUSTRIAL AVAILABILITY

The software component significance evaluation system according to the present invention allows extraction of actually frequently reused components even though they may be evaluated as having low reusability by the prior art, thereby allowing comprehension of really valuable, highly reusable components, which can be used for actual software development.

The invention claimed is:

1. A significance evaluation system with a recording and storage medium, used to reuse software components, which evaluates significance of software components, the system comprising:

similarity analysis means for determining similarity between a software component and another software component;

cluster analysis means for clustering said software component and a similar software component together into a component group, said similar software component being said another software component that has been determined to be similar to said software component;

inter-file relationship extraction means for extracting inter-file relationships, said inter-file relationships being relationships among said software component and said another software component;

inter-component group relationship extraction means for extracting inter-component group relationships, said inter-component group relationships being relationships among said component group and another component group;

relative significance calculation means for evaluating relative significance of said component group and said another component group, said inter-component group relationships being used to evaluate said relative significance; and means for conversion from the relative significance of said component group to an evaluated value of said software component, wherein said inter-file relationships are from the group consisting of inter-class inheritance, implementation of an abstract classes and interfaces, and calling of methods, and wherein said relative significance calculation means obtains the evaluated value by calculating an eigen vector with an eigen value $\lambda=1$ for a square matrix D made up of the distribution ratio d as an element.

2. The significance evaluation system according to claim 1, wherein said another software component is similar within a reference threshold to said software component.

3. The significance evaluation system according to claim 1, wherein said similarity is determined from the ratio of the number of identical lines between said software component and said another software component.

4. The significance evaluation system according to claim 1, wherein said software component is source code file.

5. A recording medium, which stores a computer program that instructs a computer system to construct the software, component significance evaluation system according to claim 1.

6. A computer program stored in a recording medium, which instructs a computer system to construct the software component significance evaluation system according to claim 1.

7. A significance evaluation system stored on a recording and storage medium, the system comprising:
   cluster analysis means for clustering a software component and a similar software component together into a component group, said similar software component being another software component that has been determined to have similarity with said software component;
   inter-component group relationship extraction means for extracting an inter-component group relationship, said inter-component group relationship being a relationship among said component group and another component group; and
   a relative significance calculation means for obtaining an evaluated value by calculating an eigen vector with an eigen $\lambda=1$ for a square matrix D made up of a distribution ratio d as an element;
   wherein a relative significance of said software component is based upon the number of times that said software component is used, said inter-component group relationship being utilized to determine said number of times.

8. The significance evaluation system according to claim 7, wherein said relative significance is the reusability of said software component.

9. The significance evaluation system according to claim 7, wherein said relative significance is obtained through a relative significance ranking method using said inter-component group relationship.

10. The significance evaluation system according to claim 7, wherein said component group is ranked against said another component group based on a relative significance of said component group and a relative significance of said another component group.

11. The significance evaluation system according to claim 7, wherein said relative significance calculation means evaluates so that a frequently used component group or a component group used by a frequently used component group can have a highly evaluated value.

12. The significance evaluation system according to claim 7, wherein said relative significance calculation means distributes a "0" to all component groups uniformly, if the component group does not use any other component.

13. The significance evaluation system according to claim 7, wherein said relative significance calculation means determines an evaluated value by distributing an evaluated value of a certain component group to all component groups at a distribution ratio d so that a using component group can have a highly evaluated value.

14. The significance evaluation system according to claim 7, further comprising:
   means for transferring a component group evaluated value to said software component belonging to said component group.

15. The significance evaluation system according to claim 7, wherein said inter-component group relationship is when a component belonging to said component group uses a software component belonging to said another component group.

16. The significance evaluation system according to claim 7, further comprising:
   similarity analysis means for determining said similarity between said software component and said another software component.

17. The significance evaluation system according to claim 16, wherein said similarity is determined from the ratio of the number of identical lines between said software component and said another software component.

18. The significance evaluation system according to claim 7, wherein said another software component is similar within a reference threshold to said software component.

19. The significance evaluation system according to claim 7, further comprising:
   inter-file relationship extraction means for extracting an inter-file relationship, said inter-file relationship being relationships among said software component and said another software component.

20. The significance evaluation system according to claim 19, wherein said inter-file relationship is from the group consisting of inter-class inheritance, implementation of an abstract classes and interfaces, and calling of methods.

21. The significance evaluation system according to claim 7, wherein said software component is source code file.

22. A computer program stored in a recording medium, which instructs a computer system to construct the software component significance evaluation system of claim 7.

23. The recording and storage medium, which stores the computer program of claim 22.

* * * * *